June 26, 1962 W. E. SCHOBER ETAL 3,040,857

MAGNETIC CLUTCH FOR TAPE REEL DRIVES

Filed Sept. 20, 1960

INVENTORS.
WAYNE E. SCHOBER
HARLEE A. ANDERSON
BY
Merchant & Merchant
ATTORNEYS

United States Patent Office 3,040,857

Patented June 26, 1962

3,040,857

MAGNETIC CLUTCH FOR TAPE REEL DRIVES

Wayne E. Schober and Harlee A. Anderson, Minneapolis, Minn., assignors to Viking of Minneapolis, Inc., Minneapolis, Minn., a corporation of Minnesota Filed Sept. 20, 1960, Ser. No. 57,329

8 Claims. (Cl. 192—84)

Figures 1, 2:
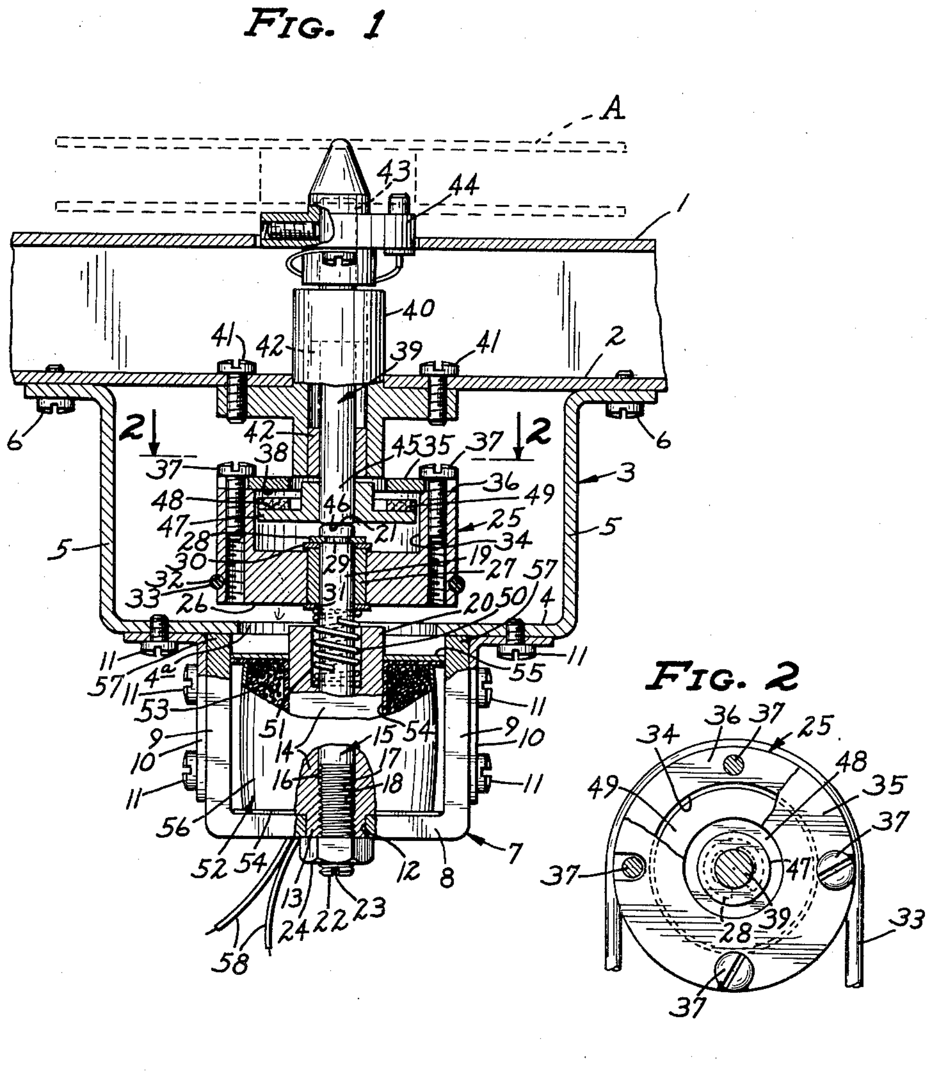

This invention relates generally to tape handling machines, and more particularly it relates to a magnetically operated friction clutch for use with tape reel drives of such machines wherein the tape is normally driven by a capstan. Generally speaking, the purpose of and an important object of this invention is to selectively drive the pay-off and take-up reels for the purposes of wind and re-wind thereof and to drive the take-up reel during normal operative driving of the tape by the capstan.

A particular problem in connection with tape handling machines has been the necessity to devise a tape reel drive system in which the starting and stopping of the tape reel would not be characterized by abrupt transitions, and in which the friction upon the tape reel shaft would be greatly minimized when the tape reel drive was in its inoperative position.

In light of the above considerations, an important object of this invention is the provision of a magnetically operated friction clutch for use with tape reel drives of tape handling machines which provides heretofore unknown smoothness of operation, and in which the normal abruptness of the transition between the operative and inoperative positions of tape reel drives is greatly minimized.

Another object of this invention is the provision of a magnetically operated friction clutch for use with tape reel drives of tape handling machines in which the friction upon the tape reel drive shaft is greatly reduced when the tape reel drive is in its inoperative position, the mass of the tape reel drive shaft structure being supported by a novel thrust bearing feature of this invention.

Another object of this invention is the provision of a magnetically operated friction clutch for use with tape reel drives of tape handling machines in which the driving mechanism or actuating mechanism exerts no radial load upon the tape reel drive shaft when the tape reel drive is in its inoperative position.

A still further object of this invention is the provision of a magnetically operated friction clutch for use with tape reel drives of tape handling machines in which simple means is provided for adjusting the magnitude of the magnetic flux circuit of the friction clutch.

Other objects of this invention reside in the provision of a magnetically operated friction clutch for use with tape reel drives of tape handling machines which does not require lubrication, and which because of its effect in the reduction of friction on the tape reel drive shaft permits the use of less driving power for the tape handling machine.

Still further objects of this invention reside in the provision of a magnetically operated friction clutch for use with tape reel drives of tape handling machines which is durable and strong in construction, relatively economical to manufacture, and highly efficient in the vindication of its purposes.

The foregoing and other objects and advantages of this invention will become apparent from the following detailed specification, appended claims and attached drawings.

Referring to the drawings wherein like reference characters indicate like parts or elements throughout the several views:

FIG. 1 is a view in elevation of our invention with some parts broken away and some parts shown in section, and showing a tape reel in dotted lines; and FIG. 2 is a view in transverse section taken on the line 2—2 of FIG. 1.

Referring with greater particularity to the drawings, and specifically FIG. 1 thereof, fixed supporting structure of a tape handling machine is shown and includes an upper deck plate 1, a lower deck plate 2, and a mounting plate, represented in general by the reference numeral 3. The mounting plate 3 comprises a lateral portion 4, which defines the central aperture 4*a*, and generally upstanding side portions 5 which are secured to the lower deck plate 2 by means of the cap screws 6. A conventional tape reel A is mounted above the upper deck plate 1 in a manner which will be hereinafter described.

A generally U-shaped core bracket, represented in general by the reference numeral 7, is disposed below the lateral portion 4 of the mounting plate 3, the core bracket 7 being formed from a flux conducting material. The core bracket 7 comprises a bottom portion 8 and upstanding side portions 9. The core bracket 7 is secured to the lateral portion 4 of the mounting plate 3 by means of a pair of angle bracket 10 which are fastened by means of the cap screws 11. The bottom portion 8 of the core bracket 7 defines a generally centrally disposed aperture 12, which is axially aligned with the aperture 4*a* and which receives and rigidly secures the lower end 13 of an elongated tubular core 14 which is generally concentrically disposed with respect to the apertures 4*a*, 12. The tubular core 14 is also formed from a flux conducting material. An elongated stationary spindle, represented in general by the reference numeral 15, is adjustably secured within the bore 16 of the core 14, the spindle 15 being screw threaded, as at 17, within the lower portion 18 of the bore 16. The upper end 19 of the stationary spindle 15 projects substantially above the upper end 20 of the tubular core 14 and defines at its free end a thrust bearing surface 21. It is noted that the lower end 22 of the stationary spindle 15 is slotted, as at 23, and receives a lock nut 24 so as to provide for the limited axial adjustment of the stationary spindle 15 with respect to the tubular core 14.

A generally cylindrical pulley, represented in general by the reference numeral 25, is generally concentrically journalled on the projecting upper end 19 of the stationary spindle 15 with freedom for limited axial sliding movements on the spindle 15. The pulley 25, or at least the lower concentric armature portion thereof, is formed from a magnetic flux conducting material, and the pulley is also disposed with its bottom surface 26 in closely spaced relation to the lateral portion 4 of the mounting plate 3. It is noted that the pulley 25 is journalled on the stationary spindle 15 with a bearing insert 27 interposed therebetween, the pulley 25 being restricted at its upper limit of axial movement by means of the reception of the split lock ring 28 within the radially opening annular recess 29 defined in the upper end 19 of the stationary spindle 15. Conventional washers 30, 31 are also disposed at the opposite ends of the bearing insert 27. The pulley 25 defines a radially opening marginal groove 32, which is adapted to receive a driving belt 33, which is connected to a suitable drive motor, not shown. The pulley 25 further defines a concentrically disposed generally axially upwardly opening internal cavity 34, which is of materially greater diameter than the diameter of the stationary spindle 15 and in which the thrust bearing surface 21 defined at the upper end 19 of the stationary spindle 15 is located.

In accordance with our invention, an annular end ring 35 is fixedly but displaceably secured to the upper annular end 36 of the pulley 25, the ring 35 being secured by means of a plurality of cap screws 37. It is noted that the annular end ring 35 partially closes the upper end of the cavity 34 and defines an annular inner friction surface 38, the function of which will be particularly described shortly.

A rotary spindle, represented in general by the reference numeral 39, is journalled in the lower deck plate 2 of the tape handling machine in co-axial alignment with the stationary spindle 15. The rotary spindle 39 is journalled by means of the journal enclosure 40 which is secured to the lower deck plate 2 by means of the cap screws 41, the journal enclosure 40 including the bearing inserts 42. The upper end 43 of the rotary spindle 39 carries a conventional reel mounting and driving head 44, and the lower end 45 of the rotary spindle 39 projects into the cavity 34 defined by the pulley 25. The lower end 45 of the rotary spindle 39 defines a thrust bearing surface 46 which bears against the aforesaid thrust bearing surface 21 of the stationary spindle 15. An annular clutch plate 47 is fixedly mounted to the lower end 45 of the rotary spindle 39 and is disposed within the cavity 34 inwardly of the annular end ring 35 when said end ring 35 is secured to the pulley 25. The upper face of the clutch plate 47 defines a friction surface 48 which is normally spaced adjacent to and cooperates with the annular friction surface 38 defined by the end ring 35 of the pulley 25. The clutch plate friction surface 48 and the annular friction surface 38 of the pulley 25 cooperate with a free floating annular friction disc 49 which is interposed in axially spaced relationship between the friction surfaces 38, 48, whereby driving engagement between the cooperating friction surfaces 38, 48 is transferred through the medium of the friction disc 49. A coil spring 50 is concentrically disposed about the stationary spindle 15 and received within the enlarged upper portion 51 of the bore 16 of the tubular core 14 so as to urge the pulley 25 in an upward direction whereby to retract the annular friction surface 38 defined by the end ring 35 thereof out of driving engagement with the friction surface 48 defined by the rotary spindle carried clutch plate 47.

For the purpose of providing axial movement of the pulley 25 and subsequent driving engagement or disengagement of the friction surfaces 38, 48, an electromagnet, represented in general by the reference numeral 52, is carried by the core bracket 7. The electromagnet 52 is disposed in such axially spaced relationship with respect to the pulley 25 that when the electromagnet 52 is energized it produces a flux circuit which bridges the horizontally extending gap between the pulley 25, the upper end 20 of the tubular core 14, and the side portions 9 of the core bracket 7, said flux circuit including at least a portion of the pulley 25. It is noted that such energization of the electromagnet 52 moves the pulley and the friction surface 38 defined by the end ring 35 of the pulley 25 in a downward direction to an operative driving position wherein the said friction surfaces 38, 48 are in driving engagement with one another. Further, the inoperative non-driving position, wherein the friction surfaces 38, 48 are in axially spaced relationship with one another is shown in FIG. 1.

The electromagnet 52 preferably, and as shown, comprises a coil or solenoid 53, and the cooperating flux circuit defining core structure comprised of the core bracket 7 and the tubular core 14, the solenoid 53 being separated from the tubular core 14 by the insulator shell 54 and topped with the top plate 55. The solenoid coil 53 is also enclosed by an axially extending wrapper 56. It is noted that the core bracket 7 is so disposed as to in effect provide an iron-clad solenoid. Further, the upper end 20 of the tubular core 14 and the upper end 57 of the side portions 9 of the core bracket 3 are in the nature of spaced poles which direct the flow of magnetic flux through the pulley 25.

Having specifically described our invention, the operative simplicity thereof is thought to be easily understandable; however, briefly stated the operation of this invention consists of energizing the electromagnet 52 (which is understood to be connected to a source of current at 58) when it is desired to impart driving rotation to the rotary spindle 39 whereby the resulting movement of the pulley 25 in a generally axially downward direction causes the above referred to driving engagement of the friction surfaces 38, 48. Of course, when it is desired that the rotary driving movement of the rotary spindle 39 be stopped, the same is accomplished merely by deenergization of the electromagnet 52 whereupon the upward thrust of the spring 50 causes separation of the friction surfaces 38, 48 to the inoperative position. Also, it should be understood that the magnetic flux gap between the pulley 25 and the magnetic poles, which gap of course is determinative of the force of the driving engagement between the friction surfaces 38, 48, is easily adjustable merely by axially adjusting the lower screw threaded end 22 of the stationary spindle 15.

This invention has been thoroughly tested and found to be completely satisfactory for the accomplishment of the above and other important objects; and while we have shown a preferred embodiment thereof, we wish it to be specifically understood that the same may be modified without departure from the scope and spirit of the appended claims.

What we claim is:

1. In a magnetically operated friction clutch for use with tape reel drives of tape handling machines, a fixed supporting structure, a stationary spindle mounted on the fixed supporting structure and having an end portion projecting therefrom and the free end of which defines a thrust bearing surface, a belt driven pulley concentrically journalled on the projecting end portion of said stationary spindle with freedom for limited axial sliding movements thereon, said pulley having a concentrically disposed internal cavity of materially greater diameter than that of said stationary spindle and in which the thrust bearing defining free end surface of said stationary spindle is located, a rotary spindle journalled in said fixed supporting structure in co-axial alignment with said stationary spindle and having one end projecting into said cavity of the pulley, the one end of said rotary spindle defining a thrust bearing surface bearing against the beforesaid thrust bearing surface of the stationary spindle, said pulley having an annular portion at one end which defines an annular friction surface partially closing one end of said cavity and through which said rotary spindle projects, a clutch plate fixedly mounted on said rotary spindle and located within said pulley cavity, said clutch plate defining a friction surface spaced adjacent to and for cooperation with the annular friction surface of said pulley, yielding means urging said pulley in a direction to retract its said friction surface out of driving engagement with the friction surface of the rotary spindle carried clutch plate, a tape reel mounting and driving head fixedly carried by the other end of the rotary spindle, the concentrically disposed generally annular other end portion of said pulley being of magnetic flux conducting material, and an electromagnet for cooperation with said other end portion of the pulley and disposed in such axially spaced relationship with respect thereto that when said electromagnet is energized it produces a flux circuit including said other end portion of said pulley whereby to move the friction surface defined by said one end of said pulley into driving engagement with the friction surface of the clutch plate carried by said rotary spindle.

2. The structure defined in claim 1 in which said electromagnet comprises a solenoid and a cooperating flux circuit defining core structure having spaced poles located in such adjacent spaced relation to said other end portion of said pulley that the latter comprises part of the flux circuit between said poles.

3. The structure defined in claim 2 in which said core structure comprises a generally tubular core portion of flux conducting material in which the stationary spindle is secured, the end of said tubular core portion spaced adjacent said other end portion of said pulley comprising one of said poles, and in which said solenoid is disposed about the tubular core portion of said core structure and is adapted when energized to produce the flow of magnetic flux through said flux circuit.

4. The structure defined in claim 3 in further combination with a free floating annular friction disc interposed between the friction surface defined by said pulley and the friction surface defined by said clutch plate whereby said driving engagement between said cooperating friction surfaces is transferred through the medium of said friction disc.

5. The structure defined in claim 4 in which the annular portion carried at said one end of said pulley comprises a fixedly attached annular generally flat end ring which is displaceable to permit the disassemblage of said clutch by the dislocation of said clutch plate and said thrust bearing defining free end surface of said stationary spindle from said pulley cavity, said end ring when assembled substantially closing the open end of said cavity after the location of said clutch plate and said thrust bearing defining free end surface of said stationary spindle within said pulley cavity.

6. In a magnetically operated friction clutch for use with tape reel drives of tape handling machines, a fixed supporting structure, a stationary spindle mounted on the fixed supporting structure and having an end portion projecting therefrom and the free end of which defines a thrust bearing surface, a belt driven pulley concentrically journalled on the projecting end portion of said stationary spindle axially inwardly from the thrust bearing defining free end surface thereof and with freedom for limited axial sliding movements thereon, a rotary spindle journalled in said fixed supporting structure in co-axial alignment with said stationary spindle, one end of said rotary spindle defining a thrust bearing surface bearing against the beforesaid thrust bearing surface of the stationary spindle, an annular friction element connected to one end portion of said pulley for rotation therewith, a clutch plate fixedly mounted on said rotary spindle, said clutch plate defining a friction surface spaced adjacent to and for cooperation with the annular friction element of said pulley, yielding means urging said pulley and said annular friction element connected thereto in a direction to retract said annular friction element out of driving engagement with the friction surface of the clutch plate carried by said rotary spindle, a tape reel mounting and driving head fixedly carried by the other end of said rotary spindle, a concentrically disposed armature formed of magnetic flux conducting material and defined by the other end portion of said pulley, and an electromagnet for cooperation with said armature and disposed in such axially spaced relationship with respect thereto that when said electromagnet is energized it produces a flux circuit including said armature of said pulley whereby to move the annular friction element connected to said pulley into driving engagement with the friction surface of the clutch plate carried by said rotary spindle.

7. In a magnetically operated friction clutch for use with tape reel drives of tape handling machines, a fixed supporting structure, a stationary spindle mounted on the fixed supporting structure and having an end portion projecting therefrom and the free end of which defines a thrust bearing surface, a belt driven pulley concentrically journalled on the projecting end portion of said stationary spindle with freedom for limited axial sliding movements thereon, said pulley having a concentrically disposed internal cavity of materially greater diameter than that of said stationary spindle and in which the thrust bearing defining free end surface of said stationary spindle is located, a rotary spindle journalled in said fixed supporting structure in co-axial alignment with said stationary spindle and having one end projecting into said cavity of the pulley, the one end of said rotary spindle defining a thrust bearing surface bearing against the beforesaid thrust bearing surface of the stationary spindle, said pulley having an annular portion at one end which defines an annular friction surface partially closing one end of said cavity and through which said rotary spindle projects, a clutch plate fixedly mounted on said rotary spindle and located within said pulley cavity, said clutch plate defining a friction surface spaced adjacent to and for cooperation with the annular friction surface of said pulley, yielding means urging said pulley in a direction to retract its said friction surface out of driving engagement with the friction surface of the rotary spindle carried clutch plate, a tape reel mounting and driving head fixedly carried by the other end of the rotary spindle, the concentrically disposed generally annular other end portion of said pulley being of magnetic flux conducting material, an electromagnet for cooperation with said other end portion of the pulley and disposed in such axially spaced relationship with respect thereto that when said electromagnet is energized it produces a flux circuit including said other end portion of said pulley whereby to move the friction surface defined by said one end of said pulley into driving engagement with the friction surface of the clutch plate carried by said rotary spindle, and a free floating annular friction disc interposed between the friction surface defined by said pulley and the friction surface defined by said clutch plate whereby said driving engagement between said cooperating friction surfaces is transferred through the medium of said friction disc.

8. The structure defined in claim 7 in which the annular portion carried at said one end of said pulley comprises a fixedly attached annular generally flat end ring which is displaceable to permit the disassemblage of said clutch by the dislocation of said clutch plate and said thrust bearing defining free end surface of said stationary spindle from said pulley cavity, said end ring when assembled substantially closing the open end of said cavity after the location of said clutch plate and said thrust bearing defining free end surface of said stationary spindle within said pulley cavity.

References Cited in the file of this patent

UNITED STATES PATENTS 1,963,638 Wilsing ---------------- June 19, 1934
2,547,137 Ochtman ---------------- Apr. 3, 1951
2,859,845 Bachman -------------- Nov. 11, 1958